April 18, 1939. H. VORKAUF 2,154,481
POWER PLANT
Filed Jan. 5, 1934 6 Sheets-Sheet 5

Inventor
Heinrich Vorkauf
per Karl A. Mays.
Attorney.

April 18, 1939.   H. VORKAUF   2,154,481
POWER PLANT
Filed Jan. 5, 1934   6 Sheets-Sheet 6

Inventor.
Heinrich Vorkauf.
per Karl A. May
Attorney.

Patented Apr. 18, 1939

2,154,481

UNITED STATES PATENT OFFICE 2,154,481

POWER PLANT

Heinrich Vorkauf, Berlin, Germany, assignor to Herpen & Vorkauf, Berlin, Germany Application January 5, 1934, Serial No. 705,383
In Germany January 9, 1933

16 Claims. (Cl. 60—49)

This invention relates to power generation and more especially to a rotary power generating plant. The invention particularly relates to a rotary vapor generator having associated therewith a rotary vapor engine and a rotary gas engine.

One object of the invention is to carry on the generation of the vapor under such conditions that not only the heat energy of the vapor may be utilized in the vapor engine for development of mechanical power which may be delivered by the power generating unit and utilized for whatever purpose is desired but that the heat energy, capable of being converged into kinetic energy, of the gases which are produced in the combustion of fuel for the generation of the vapor may also be utilized in the rotary gas engine.

In the combustion of fuels it is well known that adequate space is necessary within the combustion chamber to effect proper mixture of the fuel with combustion air for efficient and complete combustion and for the propagation of the flame without contact with the confining surfaces of the combustion chamber or with heat absorbing surfaces which would prevent complete combustion. In order to obtain a high efficiency of the combustion as well as of the vapor generation a considerable portion of the total heat generated in the furnace or combustion chamber must be absorbed under the action of the radiant heat falling upon heat absorbing surfaces.

In a rotary vapor generating unit it is necessary or desirable, however, to limit as much as possible the amount of space occupied by the rotating structure of the vapor generator. In order to effect suitable limitation of the space and of the size of the rotating structure the present invention proposes to effect combustion of the fuel at a pressure preferably considerably above the atmosphere and greater than ordinary pressures used in the combustion of fuel in stationary plants because, by thus effecting the combustion under pressure, a considerably greater quantity of the fuel may be burned per unit of volume of the combustion chamber, a higher temperature of the combustion may be secured, and a greater efficiency of the combustion may be obtained. Particularly in the generation of vapor, such as steam from water, in which there is a high amount of heat absorbed as latent heat in the vapor, the capacity of the vapor generating plant as well as its efficiency may be increased by absorption of the heat upon absorbing surfaces at high rates under the radiant heat.

The present invention, therefore, provides in a rotary vapor generator a combustion chamber providing space unobstructed by absorbing surfaces which would cool the gases and interfere with the combustion and radiation but having adjacent the boundary walls thereof fluid confining elements, such as vapor generating tubes, arranged to receive the radiant heat of the combustion of the fuel. The structure of the combustion chamber is such that the combustion gases as they are generated by the combustion are confined within the space of the combustion chamber and are discharged from the chamber substantially under the conditions of elevated pressure and temperature under which the combustion takes place and under which radiation of heat to the fluid confining heat transfer elements is effected. Thus the invention makes possible the delivery to a rotary gas engine of the combustion gases thus produced for the absorption from said gases of the heat energy thereof which may be converted into kinetic energy by the rotation of the rotary gas engine.

The invention, in the preferred embodiment, utilizes said rotary gas engine to develop the power, or such part of it as is required, to effect rotation of the rotary vapor generator. The invention also provides for utilization in the rotary vapor engine of the vapor generated in the rotary vapor generator, which rotary vapor engine, if desired, may be so connected to the rotary vapor generator as to effect rotation of said vapor generator either alone or in cooperation with the rotary gas engine.

The invention also includes the combination with the rotating structure of the rotary vapor generator or of the rotary gas engine, or of both, of heat absorbing elements, such as vapor generating elements or tubes or steam superheating tubes, arranged to absorb the sensible heat of the gases after expansion through the rotary gas engine for the purpose of effecting rotation thereof. The invention also includes utilization of the fluid to be heated as liquid or as vapor for the cooling of the elements or blades of the rotary gas engine which transform the kinetic energy of the gases to produce the rotation of said gas engine.

The invention further includes the combination with the rotary vapor generator of a rotary vapor engine and an air compressor, said rotary vapor engine being of such construction and being so connected to said air compressor that the vapor generated in the rotary vapor generator as it flows through the rotary vapor engine is controlled to effect rotation of the compressor so that the proper amount of air is delivered to the combustion chamber of the vapor generator for effecting combustion to generate the required amount of vapor. Further objects and advantages of the invention will appear from the following description taken in connection with the drawings which, by way of illustration, show what I now consider the preferred embodiment of my invention.

Figure 1:
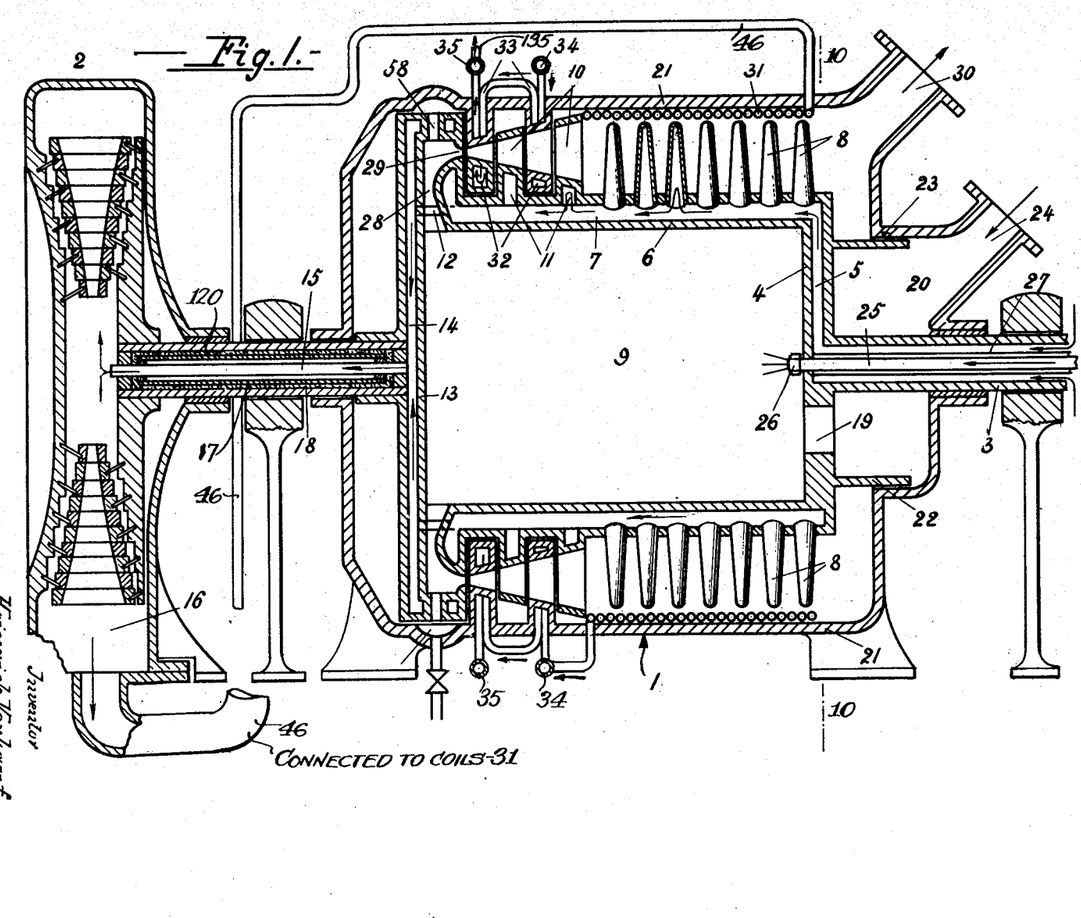
Fig. 1 is a cross sectional longitudinal view of a power plant according to my invention.
Figure 10:
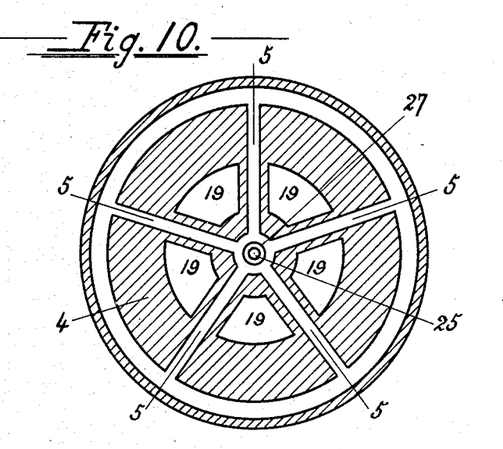
Fig. 10 is a cross sectional view of the wall 4 taken along line 10—10 in Figs. 1 and 2 and showing the channels 5.

Referring more particularly to the drawings:

Fig. 1 illustrates a power plant according to my invention consisting of power unit 1 comprising a rotary steam generator and a gas turbine constructively and operatively integral and coaxial therewith and a steam turbine unit 2 coaxial and integral with said power unit 1. The liquid to be evaporated enters the steam generator through the hollow shaft 3 which is directly connected to the revolving disc 4. Disc 4 forms the end surface of the drum or cylinder 6 and has radial openings 5 which communicate with the hollow part 7 of cylinder wall 6. A cross section of disc 4 with the radial channels 5 is shown in Fig. 10. This hollow part may be constituted by a plurality of longitudinal bores into which the liquid to be evaporated is thrown by centrifugal forces. Communicating with bores or openings 7 a great number of hollow thimbles 8 are mounted to cylinder 6. The interior 9 of cylinder 6 as well as its outer surface with the thimbles 8 is heated, as will be described later. The liquid evaporates in the hollow part 7 and the interior of thimbles 8. Cylinder 6 also serves as carrier for one set of blades 10 of the gas turbine, said carrier being hollow; its jackets 11 communicate with hollow parts 7. The vapor or steam generated in the hollow wall of cylinder 6 and in the thimbles 8 passes through jackets 11 thereby cooling the gas turbine and absorbing more heat and, thereafter, passes through channels 12 into disc 13 constituting the other end of the chamber 9 formed by cylinder 6. The closure part 13 has openings or radial bores 14 through which the vapor or steam is conducted into tube 15 located in the axis of drum 6 and therefrom into the radial steam turbine 2. It exhausts from this turbine through channel 16 and conduit 46 to coils 31 hereafter described. Tube 15 is well insulated, what I propose to do by providing an evacuated tube 17 around steam tube 15 and by filling the space between the outside of tube 17 and the inside of the hollow shaft 18 with insulating material 120. Conduits 14 serve as steam dryer and superheater. Droplets of liquid within the vapor or steam are thrown outward by the centrifugal force, and only dry or superheated vapor or steam enters tube 15.

Figure 2:
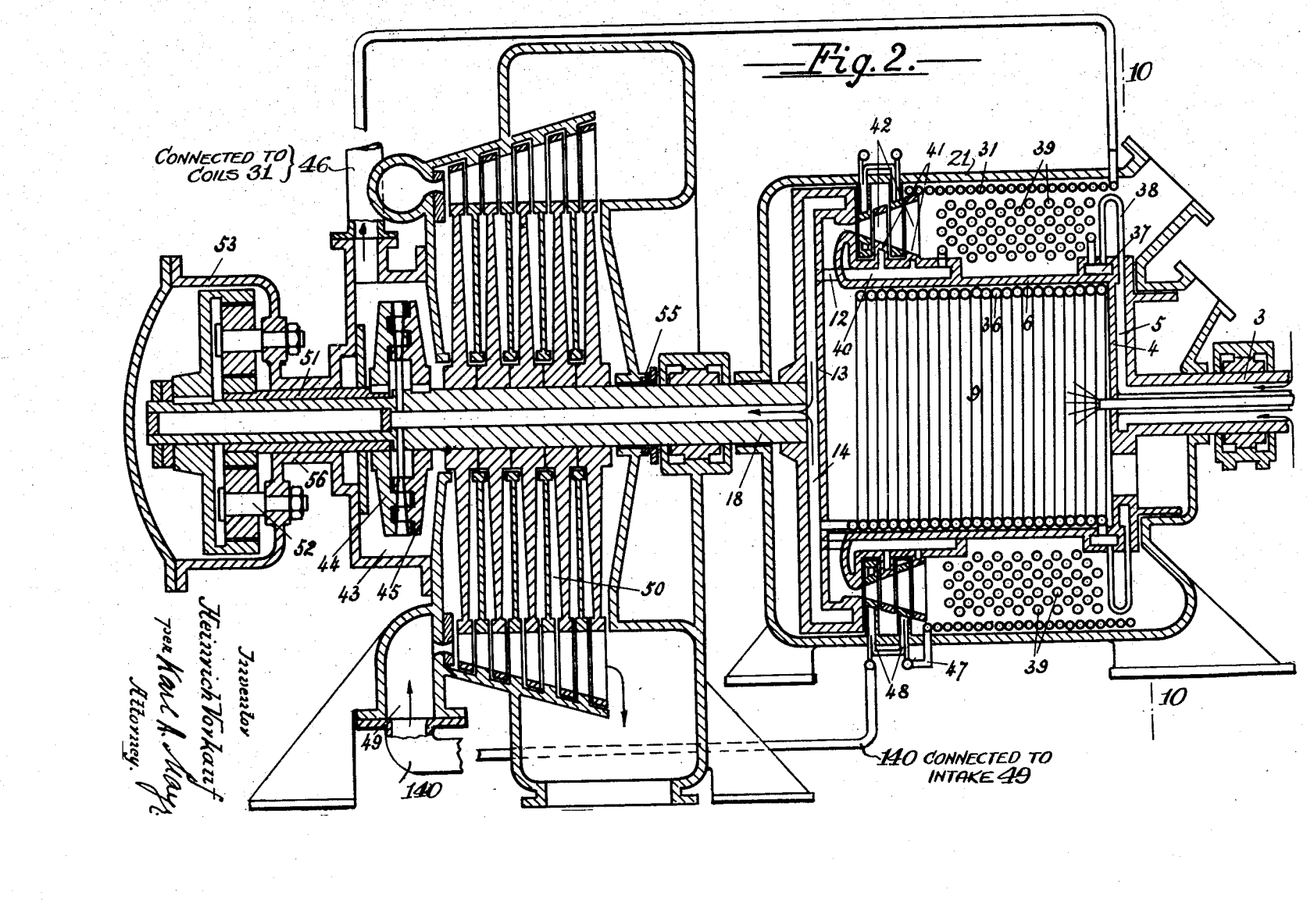
Fig. 2 is a cross sectional longitudinal view of a power plant according to my invention showing a modified construction of the steam generator and steam turbine part.

Chamber 9 communicates through openings 19 with chamber 20 of the stationary casing 21. Chamber 20 is separated from the other parts of the interior of casing 21 by cylinder 22 which is connected to disc 4 and rotates therewith. The outside of cylinder 22 conforms with and revolvably yet snugly fits into the interior cylinder surface 23 of chamber 20. Compressed air enters through socket 24 of chamber 20 into chamber 20 and therefrom into chamber 9. Pulverized, liquid or gaseous fuel enters chamber 9 through conduit 25 which is provided with a burner 26 pointing into chamber 9. A tube 27 is arranged around fuel conduit 25 and tightly connected to the interior of disc 4 so that tube 25 and with it burner 26 can easily be removed and inserted without interfering with the hollow shaft 3 which serves also as conduit for the liquid to be evaporated. Complete combustion of the fuel takes place within chamber 9, and the products of combustion, i. e., the hot gases leave this chamber through the annular opening 28 communicating with the gas turbine nozzles 29. After expansion in this turbine, the gases are further cooled by passing over the thimbles 8 and finally leave the steam generator through exhaust conduit 30. The interior of casing 21, as far as it is in contact with the stream of hot gases exhausting from the gas turbine, is covered by the heat absorbing tubes 31 which may serve as a steam reheater for reheating the exhaust steam of turbine 2. For this purpose, by means of the pipe or conduit 46 the exhaust steam from the turbine 2 may be carried to the tubes 31 as shown in Figures 1 and 2. The annular parts 32 supporting the stationary blading of the gas turbine are rigidly connected with the interior of stationary casing 21 and are, as are also the stationary blades, provided with passages 33 through which vapor or steam can be conducted. The steam enters through the annular header 34, which is connected to tube coil 31 to receive the steam therefrom, and leaves the passages through the annular header 35 from which it may be delivered through the pipe 135 to a place of use. This is an efficient means for superheating the steam and for cooling the gas turbine buckets. For generating steam or vaporizing liquids other than water, heat is transmitted to the liquid by radiation from the flame body developing in combustion chamber 9 to the cylinder 6 surrounding the combustion chamber and to the heating surfaces 4 and 13 closing the ends of the cylinder-shaped and revolving combustion chamber. Further heat is transmitted from the gases leaving the combustion chamber to the parts constituting the gas turbine and the liquid and/or vapor circulating through the interior of such parts. Finally, the gases exhausting from the gas turbine pass over thimbles 8, and more of the heat still contained in the gases is transmitted to said thimbles and to the liquid circulating therein. Part of the heat contained in the exhaust gas of the turbine is absorbed by the stationary tubes 31 lining the stationary inside wall of casing 21. The gases leaving the plant through socket 30 contain only very little heat.

Fig. 2 shows a plant operating substantially on the same principle as does the plant illustrated by Fig. 1. The arrangement of the heating surfaces of the rotary steam generator differs from the previously described arrangement and is particularly suitable for the generation of steam of high pressure requiring heavy tubes and containers. As is obvious from Fig. 2, all heating surfaces are formed by tube coils which rotate around the same center of rotation as does the cylinder 6 forming the combustion chamber 9. No bulky and inconvenient structure is required to take care of the centrifugal stresses caused by the weight of the revolving parts. The combustion chamber is surrounded by the tube coil 36, one end of which is connected to the annular chamber 37 disposed at the right end of cylinder 6, the other end terminating in the conduits 14 provided in the closure 13 of the combustion chamber 9. The liquid to be evaporated enters the steam generator through the interior of the hollow shaft 3, passes through conduits disposed in the right hand closure 4 of chamber 9 and hence through the U-bends 38 into the annular chamber 37. That part of the liquid which does not enter the coil 36 from this chamber passes into the heating coils 39 externally surrounding the generator cylinder 6. These coils discharge into a chamber 40 disposed on and integral with the left end of cylinder 6 and strengthened by the annular rims 41 which are hollow and cooled by the liquid and/or vapor and which hold the rotating blades 42 of the gas turbine.

Figure 3:
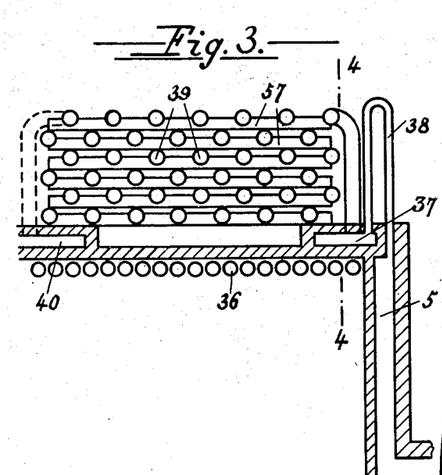
Fig. 3 is a large scale longitudinal sectional view of part of the steam generator part of the power plant as per Fig. 2 and according to my invention.
Figure 4:
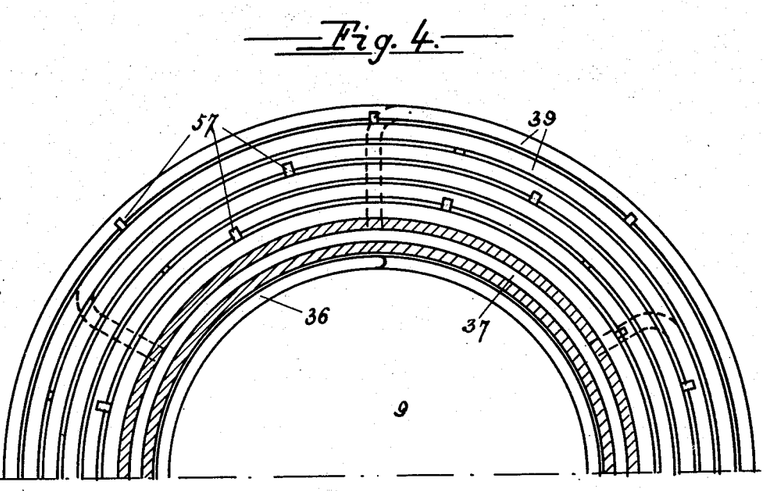
Fig. 4 is a transverse cross sectional view of the steam generating part illustrated in Fig. 3 and taken along line 4—4 of Fig. 3.

The before described heating surfaces are shown on a large scale in Figs. 3 and 4. The same numerals are used to designate like parts. On these figures the coil 39 does not consist of one continuous coil but is composed of six concentric individual coils all being individually connected at one end to chamber 37 and at the other end to chamber 40. Stays 57 are provided in between the individual coils and are equally distributed over the whole circumference thus rendering the whole coil a compact unit and maintaining the individual coils at equal distance from one another and concentric with respect to each other.

As is obvious from Fig. 2, the vapor or steam passes from chamber 40 through channels 12 into the conduits 14. From conduits 14 the steam passes through the interior of the hollow shaft 18 into the radial turbine 43 consisting of two counterrotating parts 44 and 45. This counterrotation permits the use of very high relative speeds and an efficient conversion of the heat energy contained in the high pressure steam into mechanical power. The exhaust from the high pressure turbine is conducted into the reheating coil 31 by means of conduit 46. It leaves the reheater at 47 and passes through conduits 48 thereby cooling the stationary buckets of the gas turbine and absorbing more heat and by means of conduit 140 is then conducted to the intake 49 of the low pressure turbine 50.

The counterrotating part 44 of the high pressure turbine is keyed to shaft 51 and drives the reversing gear 52 which transmits the torque developed by part 44 to shaft 18 and shaft 3 which latter is directly coupled to shaft 18. A power consuming machine may be connected to shaft 3. Chamber 53 of the reversing gear 52 is adapted to withstand the exhaust pressure of the high pressure turbine, and it will be noted that there is no gland or stuffing box through which high pressure steam may leak. The whole unit has only one gland 55 disposed at the exhaust end of the low pressure turbine 50 where no loss of steam is possible. The high pressure end of the turbine casing carries the bearing 56 which supports the hollow counterrotating shaft 51 as well as the main shaft 18.

Figure 5:
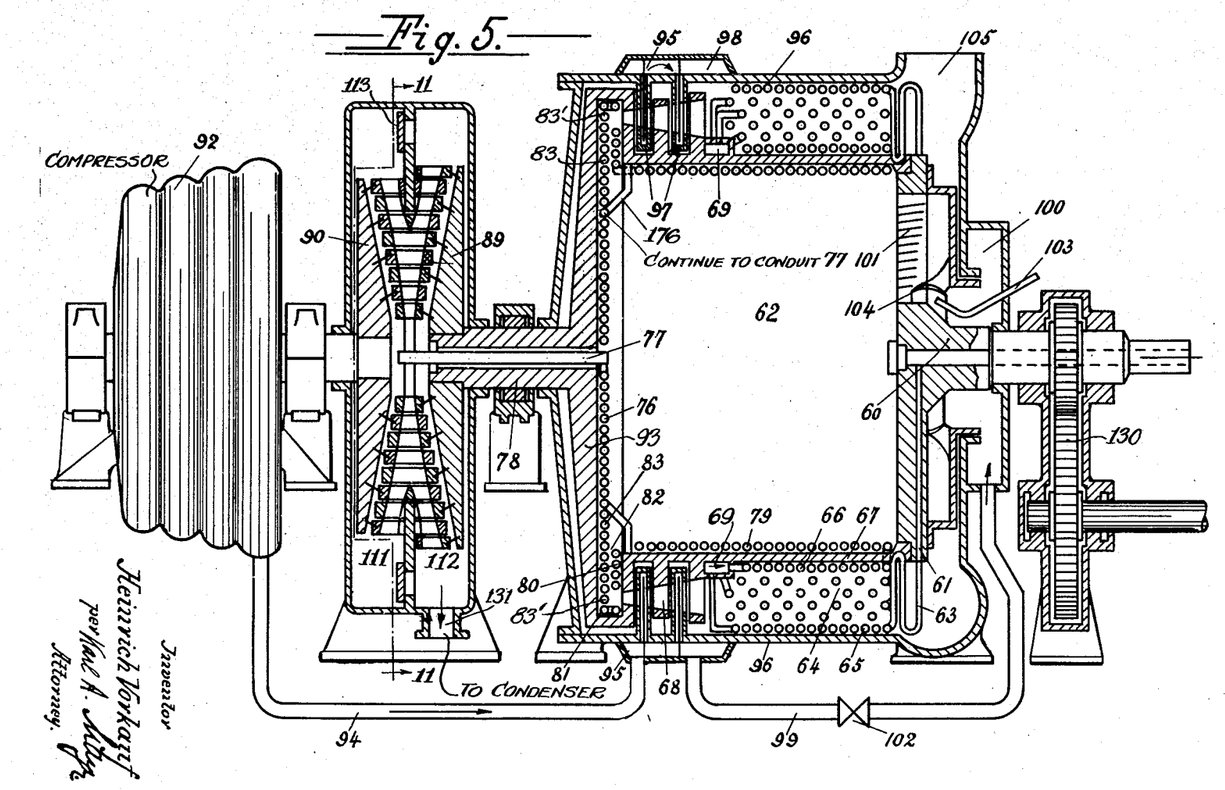
Fig. 5 is a longitudinal part sectional view of a power plant according to my invention comprising a compressor and a steam generator adapted to produce steam of very high pressure.

Fig. 5 illustrates a power plant according to my invention having a compressor for the combustion air arranged integral with it and having a steam generator suitable for generating steam of very high pressure. It also shows an efficient way of controlling the output of the compressor. The liquid to be evaporated enters the system through the hollow shaft 60. It then passes through conduits 61 in the right hand cover of the cylindrical combustion chamber 62 into the U-bends 63 and therefrom into the convection coils consisting of closely wound coils 65 forming a rotating cylinder and the staggered coils 64. Coils 64 and 65 terminate in the annular chamber 69.

Figure 6:
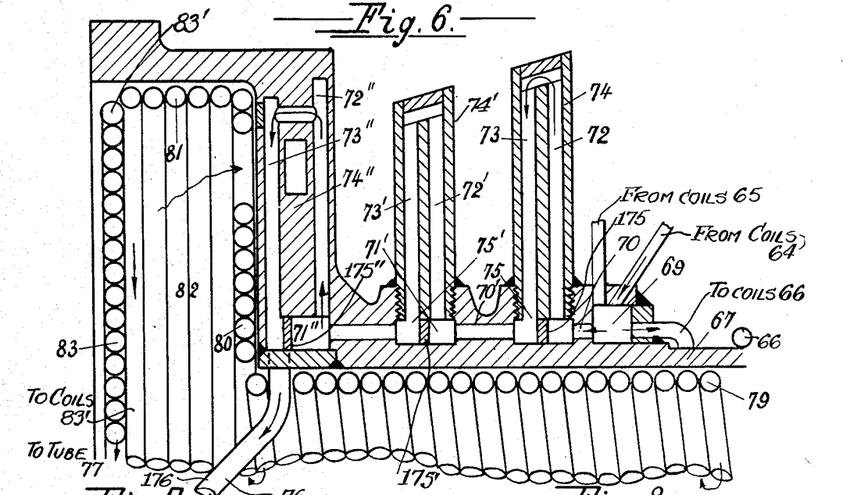
Fig. 6 is a large scale cross sectional view of the gas turbine and adjacent parts.

As may be seen in Figure 6, conduits 70 lead from the chamber 69 to ports 71 formed in the rotating structure of the steam generator. From the ports 71 the liquid to be evaporated together with any vapor generated therefrom in the coils 64 and 65 flows into the channels 72 of the rotating blades 74 of the gas turbine, which are suitably fastened in the rotating structure or cylinder 67 of the generator. As shown by the arrows, the liquid or vapor then flows through the channels 73 and into the ports 75 which are separated from the ports 71 by the partition 175. Through the conduits 70' the fluid is then conducted to the ports 71' from which it flows through the channels 72' and 73' of the second blade 74' and into the port 75' separated from the port 70' by the partition 175'. The vapor and any liquid mixed therewith may then flow into the ports 71'' from which, through the channels 72'' and 73'' it may flow into the tubes 176. The ports in the parts 74'' to which the tubes 176 are connected are separated from the ports 72'' by partitions 175''. The tubes 176 extend as shown in Figures 5 and 6 radially to connect to spiral coils 76 which, at their other ends, discharge into the steam tube 77, shown in Figure 5, located within the hollow shaft 78 and well insulated therefrom in the manner previously described.

Part of the steam is conducted from the chamber 69 into the closely wound coils 66 which protect cylinder 67 from the intense heat of the gas exhausting from turbine 68. The right hand ends of these coils are connected with the closely wound tube coils 79 surrounding the combustion chamber 62 and absorbing heat from the hot flame body in this chamber by radiation. Coil 79 continues into the spiral coil 80 and the windings 81 which line the outermost axial surface of the annular chamber 82 which conducts the hot gases into the gas turbine nozzles. Coils 81 continue into the outermost coil 83' of the flat spiral coils 83 which are continued to the conduit 77 as indicated by the legend in Fig. 5. Coils 76 and 83 form the left end wall of combustion chamber 62 and protect the rotating casing part 93 from the intense heat within the combustion chamber as is obvious from Fig. 5.

Figures 7, 8, 9:
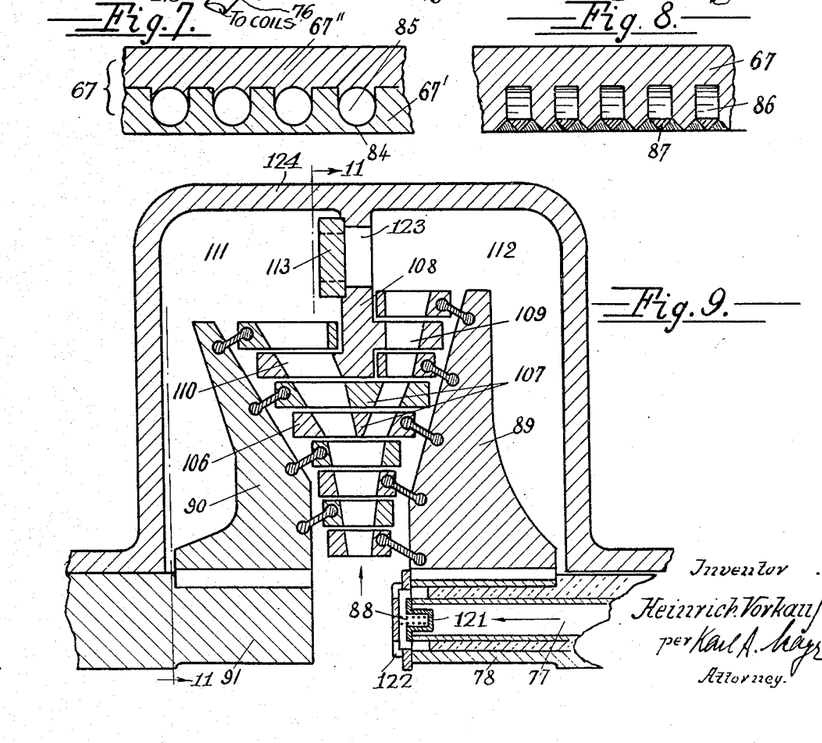
Fig. 7 is a cross sectional view of a constructional detail.
Fig. 8 is a cross sectional view of a constructional detail.
Fig. 9 is an axial cross sectional schematic view of the steam turbine having control provisions according to my invention.

Instead of providing tube coil 79 which is liable to collect soot, cylinder 67 may be efficiently cooled by the provision illustrated in Figs. 7 and 8. These assure a perfectly smooth interior surface which can easily be cleaned. According to Fig. 7, drum 67 consists of two parts 67' and 67''. 67' is provided with spiral grooves 84, and 67'' with corresponding elevations and grooves 85 so that both parts 67' and 67'' can be screwed into one another, and a continuous spiral-like conduit is formed for circulating the steam which efficiently cools the drum 67'—67''. The body 67'' may be rolled on to body 67' so that a tight channel is formed. The exterior part 67'' of the cylinder may be used for carrying the rotating buckets of the gas turbine.

Fig. 8 shows a modification whereby a groove 86 of spiral configuration is machined into cylinder body 67, the grooves being closed by the spiral part 87 which is welded on to cylinder 67. In this way also, a spiral channel for the steam and an efficient cooling of the cylinder and the combustion chamber is obtained.

The highly superheated high pressure steam discharged from the generator into tube 77 enters the steam turbine which is illustrated on a large scale in Fig. 9. At the end of tube 77 a spring loaded overflow or check valve 121 is arranged. This valve is pressed on to the end of tube 77 by means of spring 88 and permits the steam to pass from tube 77 through ports 122 into the turbine and prevents flow in reverse direction. The turbine consists of a rotor 89 keyed to shaft 78 and a counterrotating rotor 90 keyed to shaft 91 which is directly connected to compressor 92 for the combustion air which is shown in Fig. 5. The compressor discharges into conduit 94 which is connected with the annular chamber 95 disposed on the outside of the stationary casing and adjacent to the gas turbine. Chamber 95 is connected by a great number of bores with the interior of the annular rings 97 carrying the stationary blading of the gas turbine. The compressed air passes through the interior of the blades thereby cooling these blades and the rings to which they are connected and absorbing heat. The new highly preheated air enters the annular chamber 98 and is therefrom conducted through conduit 99 into the air chamber 100 directly communicating with the burner 101. A regulating valve 102 is provided in conduit 99 for controlling the pressure and the amount of air supplied to chamber 100.

Liquid fuel is supplied through pipe 103 and spread on to the trough 104 which may be connected to the rotating drum 67 and rotate with it. Burner 101 consists of a plurality of annular concentric rims, and the fuel oil sprayed from the trough 104 is thrown outwards from one rim to the other whereby it is efficiently atomized and vaporized and mixed with the preheated high pressure combustion air. This type of burner assures an efficient distribution of the combustion over the whole cross section of the cylindrical combustion chamber 62 and prevents that individual sections of the chamber are more favored with fuel than others.

The hot gases resulting from the combustion leave the combustion chamber through the annular chamber 82 and enter therefrom the nozzles of the gas turbine, expand in said turbine and supply the power for rotating drum 67 and the heating surfaces connected thereto and to shaft 60. From shaft 60 the power may be transmitted to a gear 130 and therefrom to power consumers.

The gases exhausting from the turbine transmit their heat to the previously described coils 64 and 65 and leave the steam generator through the uptake 105.

An efficient and economical control of the air supplied by compressor 92 is of great importance in power units according to my invention. A control of the admission of the gas turbine is not feasible. Therefore, the gas pressure must be varied if variable outputs are demanded from the gas turbine. The compressor must increase the pressure of a great amount of air just at such times when there is little power available from the steam side of the power unit. On the other hand, large amounts of power are available from the steam turbine at times when little air and/or pressure is required from the compressor. A mere control of the air by manipulation of throttle valve 102 would be wasteful. I propose to control the power supplied to the compressor and, in addition, to manipulate valve 102. The provision of a counterrotating turbine as shown in Fig. 9 lends itself very well to such a control method. Compressor 92 is directly connected to one of the rotors, and no reversing gears or the like are required. From turbine stage 106 onwards the steam stream is split into two streams by the provisions of the partitions 107 provided in the rotating blading and the stationary partition 108 which may, at the same time, hold the stationary buckets 109 and 110. One part of the steam flows to chamber 111 and the other into chamber 112 which may be connected with a condenser by means of conduit 131 shown in Fig. 5. Chambers 111 and 112 are connected by the annular valve 113. If this valve is closed, all steam goes into chamber 112 which has an outlet to a condenser, and little power is produced by rotor 90 and transmitted to the compressor. The more valve 113 is opened, the more steam flows also into chamber 111 and produces power for compressor 92 increasing the speed of the compressor and its output and/or pressure of the compressed air. The power generated by rotor 89 is transmitted through shaft 78 and steam generator rotor 67, where it is supplemented by power produced by the gas turbine, on to shaft 60 and therefrom to power consumers.

Figure 11:
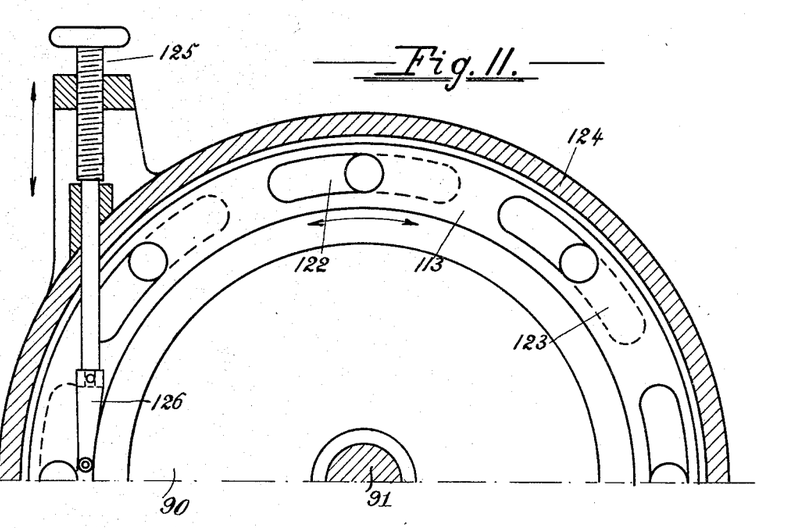
Fig. 11 is a radial cross sectional view through a part of valve 113 taken along line 11—11 in Figs. 5 and 9.

Fig. 11 is a front view of a section of the valve 113. It has the shape of a ring which is provided with openings 122 corresponding with openings 123 shown partly in dotted lines in Fig. 11. Openings 123 are arranged in the annular partition extending inwardly from the casing 124 and constituting the wall between chambers 111 and 112 which are shown in Fig. 9. Upon a clockwise rotation of the valve 113 from the position shown in Fig. 11 a larger part of the openings 122 matches with openings 123 and the valve openings are enlarged permitting passage of more steam from chamber 111 into chamber 112 and therefrom into the condenser. Upon a counterclockwise rotation of the valve ring 113 the parts become smaller. Rotation of the valve is carried out by pushing in or pulling out of the operating rod 125 which is connected to the ring by a link 126.

The generators described are suitable not only for generating steam but also for vaporizing mercury or other matters. The area of the heating surfaces is very small, and the conduit connecting the generator and the turbine is short. The centrifugal force set up in the admission conduits to the main heating surfaces and the steam column in the discharge conduits suffice to operate the generators, and no special feed pump is required. The circulation through the generator, however, may be effected also in any other way.

The combustion chambers can be fired not only with fuel oil but also with gaseous fuel or with pulverized coal or with a combination of the various kinds of fuel. If pulverized coal is used, care must be taken to efficiently remove fly ash before the gases enter the gas turbine which rotates the steam generators. This I propose to do by providing apertures 58, shown on Fig. 1, in the revolving casing and a groove 59 in the stationary casing. By the centrifugal force the fly ash is thrown through the apertures and collected in and periodically removed from the annular groove. Thus the gas entering the gas turbine is pure.

The power generating unit according to my invention can be used for stationary as well as for motive power plants. Its weight and space requirements are very small and it is, therefore, particularly useful for operating vehicles and, still more so, for supplying power to flying machines and airships.

While I believe the above described embodiments of my invention to be preferred embodiments, I wish it to be understood that I do not desire to be limited to the exact details of process, design and construction shown and described, for obvious modifications will occur to a person skilled in the art.

What I claim is:

1. Power plant comprising a structure providing a wall extending about a substantially unobstructed space to form a combustion chamber for confining therein the combustion gases while developing radiant heat radiating toward said wall, means for confining a fluid under pressure arranged adjacent the boundaries of said combustion chamber and so as to receive said radiant heat radiating toward said wall and to transfer said heat to said fluid, said structure and said fluid confining means being arranged for rotation upon an axis, a rotary engine of the type which is actuated by the expansion of gases, said engine having the rotor thereof connected to said structure and to said fluid confining means to rotate therewith, means providing a passage for confining and for delivering to said rotary engine from said combustion chamber the gaseous products of combustion substantially in the condition thereof in said combustion chamber so as to cause rotation of said rotor, and means for delivering exteriorly of said structure said heated fluid under said pressure while maintaining rotatability of said fluid confining means.

2. Power plant comprising a structure providing a wall extending about a substantially unobstructed space to form a combustion chamber for developing radiant heat radiating toward said wall and for confining the combustion gases within said space during combustion, a vapor generating element confining therein the liquid to be vaporized arranged adjacent the wall of said combustion chamber and so as to receive said radiant heat and to transfer said heat to said liquid, said structure and said vapor generating element being arranged for rotation upon an axis, a rotary gas engine having a rotor thereof connected to said structure and to said generating element to rotate therewith, means providing a passage for confining and for delivering to said rotary engine from said combustion chamber the gaseous products of combustion substantially in the condition thereof in said combustion chamber so as to cause rotation of said rotor, and means for delivering the generated vapor from said element while maintaining rotatability thereof.

3. Power plant comprising a structure providing a wall extending about a substantially unobstructed space to form a combustion chamber for developing radiant heat radiating toward said wall and for confining the combustion gases under a given condition of pressure during combustion, a steam generating element confining the water therein and lining said wall on the side thereof toward the combustion space to intercept the heat radiated toward said wall and to transfer said heat to the water to generate the steam, said structure and said steam generating element being arranged for rotation on an axis, a rotary gas engine having a rotor connected to said structure and to said steam generating element to rotate therewith, means providing a passage for confining and for delivering to said rotary gas engine from said combustion chamber the gaseous products of combustion substantially in the condition under which said combustion takes place and so as to cause rotation of said rotor, and means for delivering the generated steam from said element while maintaining the rotatability thereof.

4. Power plant comprising a structure providing a wall extending about a space to form a combustion chamber for developing radiant heat radiating toward said wall, a heat absorbing element confining therein fluid to be heated and arranged adjacent the boundaries of said combustion chamber to receive the heat radiated toward said wall and to transfer said heat to said fluid, said structure and said heat absorbing element being arranged for rotation on an axis, a rotary gas engine having a rotor connected to said structure and to said heat absorbing element to rotate therewith, means for delivering to said rotary gas engine from said combustion chamber the gaseous products of combustion so as to cause rotation of said rotor, a heat transfer element confining a fluid to be heated arranged to rotate upon said axis and connected to rotate with said rotor of said rotary gas engine, and means providing a gas passage for causing the gases discharged from said rotary gas engine to flow in heat transferring contact with said heat transfer element.

5. Power plant according to claim 2 comprising a rotary vapor engine having a rotor thereof connected to rotate with said rotatable vapor generating element, and means for delivering the generated vapor to said rotary vapor engine to cause rotation of said rotor.

6. Power plant comprising a structure providing a wall extending about a substantially unobstructed space to form a chamber for combustion of fuel for developing radiant heat therein and to confine the combustion gases within said chamber during combustion, a vapor generating element confining therein the liquid to be vaporized arranged adjacent the boundaries of said combustion chamber and so as to receive said radiant heat and to transfer said heat to said liquid, said structure and said vapor generating element being arranged and being connected to rotate together upon a common axis, a rotary vapor engine having a rotor thereof arranged to rotate upon said axis and being connected rotatably to drive said structure and said vapor generating element, means for delivering the vapor generated in said element to said rotary vapor engine to cause rotation of said rotor, and means providing a passage for confining and for delivering the combustion gases from said chamber substantially in the condition under which the combustion takes place in said chamber.

7. Power plant comprising a structure providing a wall extending about a substantially unobstructed space to form a combustion chamber for developing radiant heat therein and to confine the gases within said chamber under the conditions of combustion, steam generating surfaces extending about said chamber and arranged adjacent the boundaries of said chamber to receive the radiant heat developed in said chamber, said structure and said steam generating surfaces being arranged for rotation on an axis, a rotary gas engine having a rotor connected to said structure and to said steam generating surfaces to rotate therewith, means for effecting combustion of fuel in said chamber, said means and said structure being so constructed and arranged as to develop by said combustion in said chamber pressure and temperature of the combustion gases sufficient to operate said rotary engine, and means providing a passage for confining and for delivering to said rotary gas engine said combustion gases substantially at said pressure and temperature to cause said rotor to rotate said structure and said steam generating surfaces.

8. Power plant according to claim 7 comprising walls forming a cylinder enclosing said combustion chamber, said walls having formed therein channels for confining the water to be evaporated arranged to receive said radiant heat.

9. Power plant according to claim 7 comprising a tubular element providing at least a part of said steam generating surface receiving radiant heat coiled about said chamber adjacent the boundaries thereof.

10. Power plant according to claim 4 in which said heat transfer element is formed in coils about said structure in spaced relation in said gas passage for transfer to said element of heat from said gases by convection.

11. Power plant according to claim 1 comprising a nozzle in which the combustion gases delivered thereto by said passage expand so as to act upon the rotor of said rotary gas engine, and means for confining in heat transfer contact with the wall of said nozzle a fluid to be heated.

12. Power plant according to claim 2 in which said rotor of said rotary gas engine is provided with a blade upon which said combustion gases act to cause rotation of said rotor, said blade being formed with a channel therein capable of confining a fluid, said channel being connected to receive the generated vapor for flow therethrough to heat said vapor and cool said blade, and means for withdrawing said heated vapor from said channel without interfering with the rotatability of said rotor.

13. Power plant comprising a structure providing a rotary vapor generator, a rotary vapor engine having two rotors upon a common axis arranged to rotate in opposite directions under the action of a common flow of vapor in the expansion thereof, an air compressor having a rotating member, one of said rotors of said rotary vapor engine being connected to said rotating member of the compressor to cause rotation thereof, the other of said rotors being connected to said rotary vapor generator to cause rotation thereof, means for delivering to said rotary vapor engine the vapor generated in said rotary vapor generator, to cause rotation of the rotors of said engine in opposite directions, means dividing the flow of said vapor as it expands in acting on the rotors of said vapor engine, and means for controlling the flow of at least one divided portion to vary the proportions of the total amount of the vapor acting on the two rotors so as to vary the rotation of said compressor relative to the rotation of the generator.

14. Power plant comprising a structure providing a rotary vapor generator, a rotary vapor engine having two rotors upon a common axis arranged to rotate in opposite directions under the action of a common flow of vapor in the expansion thereof, an air compressor having a rotating member, one of said rotors of said rotary vapor engine being connected to said rotating member of the compressor to cause rotation thereof, the other of said rotors being connected to said rotary vapor generator to cause rotation thereof, means for delivering to said rotary vapor engine the vapor generated in said rotary vapor generator, to cause rotation of the rotors of said engine in opposite directions, means dividing the flow of said vapor as it expands in acting on the rotors of said vapor engine, each of said rotors being constructed with a passage for vapor flow therethrough during said expansion, said rotors being arranged with respect to each other so that passages in the two rotors are in a common path of vapor flow, said rotors each being constructed and being arranged in relation to said dividing means with a passage thereof located in the path of flow of a separate divided portion of said vapor acting separately on said rotor, each of said passages being common to both rotors, and means for varying flow of vapor through one passage in inverse relation to the flow of vapor through the other passage to vary the rotation of the compressor relative to the rotation of the vapor generator.

15. Power plant according to claim 13 in which the rotary vapor generator is constructed with a chamber for combustion of fuel under pressure, a connection from the discharge of said air compressor to said combustion chamber of the rotary vapor generator for delivery thereto of air under pressure.

16. Power plant according to claim 1 in which said rotor of said rotary gas engine is provided with a blade upon which said combustion gases act to cause rotation of said rotor, said blade being formed with a channel therein capable of confining a fluid, said channel being connected to receive fluid to be heated for flow therethrough to heat said fluid and cool said blade, and means for withdrawing said heated fluid from said channel without interfering with the rotatability of said rotor.

HEINRICH VORKAUF.